Jan. 15, 1929.
R. J. DE MAN
1,698,782
ELECTRIC CURRENT RECTIFIER
Filed Feb. 16, 1928
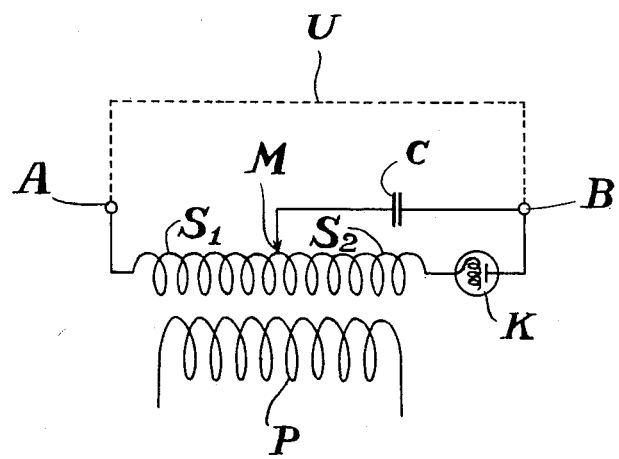
INVENTOR
Robert Jean de Man
By
ATTORNEY Patented Jan. 15, 1929.

1,698,782

UNITED STATES PATENT OFFICE.

ROBERT JEAN DE MAN, OF ANTWERP, BELGIUM.

ELECTRIC CURRENT RECTIFIER.

Application filed February 16, 1928, Serial No. 254,822, and in Belgium February 23, 1927.

This invention has reference to static current rectifiers comprising in combination a transformer, a condenser and an electronic valve. It has for its object to provide a current rectifier of this kind which will be adapted to convert alternating current into direct pulsating current suitable for use in radiology and adapted to feed X-ray tubes with a much higher efficiency than is obtainable with a mechanical rectifier.

In the static rectifier according to the invention the electronic valve is mounted in series with the secondary winding of a transformer and the condenser is shunted on a circuit comprising the valve and a portion only of said secondary winding, the terminals for connecting the external circuit being situated respectively at the free end of the secondary winding and at a point intermediate the valve and the condenser. With this arrangement the condenser charged by the positive wave of the alternating current from the transformer, discharges in the external circuit during the negative wave which is checked thereby.

The accompanying drawing illustrates diagrammatically an embodiment of this invention.

In the drawing $S_1$ $S_2$ are two portions of the secondary winding of a transformer, the primary winding P of which is connected in a known manner to a supply of alternating current. An electronic valve K is mounted in series with the secondary winding $S_1$ $S_2$ and this valve, together with the adjacent portion $S_2$ of said winding, is shunted by a condenser C respectively connected to a point M intermediate $S_1$ and $S_2$ and to the terminal B. The other terminal A is situated at the free end of the portion $S_1$ of the secondary winding, and to the terminals A and B is connected the external circuit U comprising for example an X-ray tube.

Supposing the point M is in the middle of the winding $S_1$ $S_2$, a positive wave passing through the transformer will cause the winding $S_2$ to charge the condenser C through the valve K and will set up at B a potential $x$. This potential will be maintained while the negative wave passes, the valve K preventing the condenser from discharging through K, $S_2$, M. Meanwhile, the winding $S_1$ will cause the potential at A to oscillate between $x$ and $-x$, so that the maximum tension in the circuit U is $x-(-x)=2x$, which is the full tension supplied by the transformer, while the minimum tension is $x-x=0$.

By varying the position of point M along the secondary winding of the transformer the degree of asymmetry of the rectified current can be varied at will.

I claim:

1. In a static current rectifier, the combination of a transformer, an electronic valve in series with the secondary winding of said transformer, a circuit shunting said valve and a portion of said secondary winding adjacent said valve, a condenser in said circuit, and terminals respectively located at the free end of said secondary winding and at a point intermediate said valve and said condenser.

2. In a static current rectifier, the combination of a transformer, an electronic valve in series with the secondary winding of said transformer, a movable connection dividing said secondary winding into two adjustable portions, a conductor extending from said connection and shunting said valve and the portion of said secondary winding adjacent said valve, a condenser interposed in said conductor, and terminals respectively located at the free end of said secondary winding and at a point intermediate said valve and said condenser.

ROBERT JEAN DE MAN.